(No Model.)
F. M. WOODS.
Meat Safe and Smoker.
No. 238,471. Patented March 1, 1881.
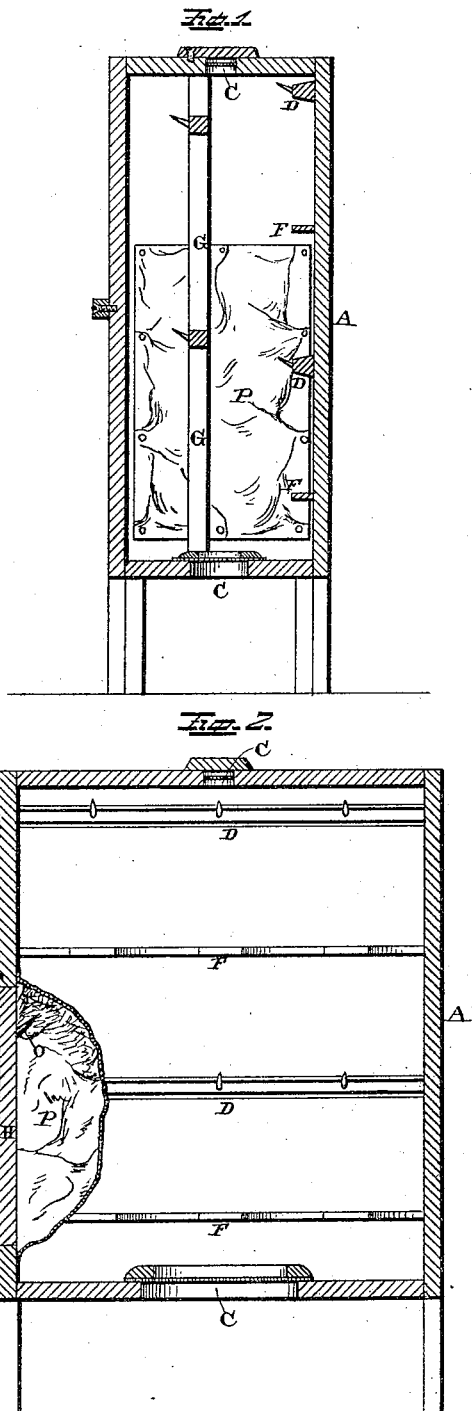
Witnesses
Wm. W. Mortimer
Will. H. Kern
Inventor.
F. M. Woods,
per
F. A. Lehmann,
Att'y

UNITED STATES PATENT OFFICE.

FRANK M. WOODS, OF YORK, ILLINOIS.

MEAT SAFE AND SMOKER.

SPECIFICATION forming part of Letters Patent No. 238,471, dated March 1, 1881.

Application filed October 11, 1880. (No model.)

*To all whom it may concern:*

Be it known that I, FRANK M. WOODS, of York, in the county of Clark and State of Illinois, have invented certain new and useful Improvements in Meat Safes and Smokers; and I do hereby declare the following to be a full, clear, and exact description of the invention, such as will enable others skilled in the art to which it pertains to make and use it, reference being had to the accompanying drawings, which form part of this specification.

My invention relates to an improvement in meat-safes; and it consists in the hinged door which fits in an opening in one end of the safe, and which is provided with a supporting-foot, so as to form a table upon which to cut meat, the opening in the frame in which the door fits being covered over by means of some flexible material, which will serve to keep out flies and insects while the door is being used as a table for cutting meat, all of which will be described hereinafter.

The object of my invention is to construct a safe in which meats of different kinds can be smoked and kept ready for daily use or sale, and which is provided with a cutting-table which fits in the side of the frame, so that all necessity for a separate and distinct cutting table or block is entirely done away with.

Figure 1 is a vertical cross-section of my invention. Fig. 2 is a vertical longitudinal section of the same.

A represents the frame of the safe, which is preferably made rectangular, as here shown, and of any desired size or construction that may be preferred.

Upon the front side of the safe are two doors, through which the meat is introduced and removed, and through both top and bottom of the frame is made a ventilating and smoke hole, C, which are covered over with wire-gauze, so as to keep out insects. The upper one of these holes is provided with a cover, by means of which it can be closed at any time. The lower one of these openings is made considerably larger than the upper one, so that the smoke from any suitable device may be readily passed into the safe. As the upper opening is much smaller than the lower one, the smoke is prevented from escaping very rapidly, and hence is held in contact with the meat for some time.

To the back part of the safe are secured any number of cross-bars D, which are provided with hooks upon which to hang the meat, and in order to prevent the meat from hanging against the side of the back, where the smoke could not readily reach it, a rib, F, is placed below each cross-bar, as shown. These ribs extend out any suitable distance from the back, and force the meat which is to be smoked out any suitable distance into the safe, where it will be readily acted upon on all sides alike. These ribs are very important for the perfect working of the safe where meats are to be smoked, for unless they are used it will be found that the meats are smoked very unevenly.

In order that the hooks upon the back of the safe may be readily filled, the frame G, which is also provided with hooks upon which to hang meat, is made removable from the safe, so that while the rear hooks are being filled with meat this frame will not be in the way. After the rear hooks have been filled this frame is inserted, as shown, and then filled with meat in the same manner. The upper ends of this frame are centered in recesses in the top of the safe, so as to prevent it from moving, while the lower ends rest solidly upon the floor. By the use of this frame a much larger quantity of meat can be both smoked and kept in the safe at the same time.

Through one end of the safe is made an opening, which is closed by means of a door, H, which is hinged at its lower end only. To the outer side of this door, near its upper end, is hinged the foot or support I, which, when the door is turned downward to a horizontal position, so as to form a table, supports it in position. Projecting inward from the inner side of this door is a hook, O, upon which the meat which is being cut can be hung and kept ready for use without having to open the doors of the safe every time that a piece is wanted. In order to prevent insects from coming into the safe while this door is being used as a cutting-table, the opening is closed inside of the safe by means of a piece of cloth or flexible material, P, of any kind, and which is enough larger than the hole to form a sort of a bag around it. By thus making a sort of a bag around the opening there is room left for the meat which is hung upon the hook O when the door is closed, By thus forming a cutting-table out of the door all need of a separate and distinct cutting block or table is done away with, and a means is provided for keeping meat where it can be readily gotten at without having to open the doors of the safe in such a way as to admit insects.

Having thus described my invention, I claim—

1. A meat-safe having an opening in its side, in combination with a falling door provided with a support, so as to form a cutting-table, and having a hook upon which meat can be hung, substantially as specified.

2. A meat-safe having an opening through its side, which is covered by a suitable material, in combination with a door provided with a hook on which to hang meat, and a leg to form a cutting-table, the parts being combined and arranged to operate substantially as shown.

In testimony that I claim the foregoing I have hereunto set my hand this 5th day of October, 1880.

FRANK M. WOODS.

Witnesses:
HENRY G. HODGE,
ELISHA A. JACKSON.